Feb. 28, 1939. N. B. WALES ET AL Re. 21,020

WASHING MACHINE

Original Filed April 7, 1927 4 Sheets-Sheet 1

Inventors
Nathaniel B. Wales
and Charles Roberts.

By
McCoskey Dawson & Booth
Attorneys

Feb. 28, 1939. N. B. WALES ET AL Re. 21,020

WASHING MACHINE

Original Filed April 7, 1927 4 Sheets-Sheet 2

Inventors.
Nathaniel B. Wales
and Charles Roberts.

By

McConkey Dawson & Brock
Attorneys.

Feb. 28, 1939. N. B. WALES ET AL Re. 21,020

WASHING MACHINE

Original Filed April 7, 1927 4 Sheets-Sheet 3

Inventors.
Nathaniel B. Wales
and Charles Roberts

By McCoubrey Dawson & Booth
Attorneys.

Inventors.
Nathaniel B. Wales.
and Charles Roberts.
By
W. Coulter Dawson & Booth
Attorneys.

Reissued Feb. 28, 1939

Re. 21,020

UNITED STATES PATENT OFFICE 21,020

WASHING MACHINE

Nathaniel B. Wales and Charles Roberts, New York, N. Y., assignors, by mesne assignments, to Bendix Home Appliances, Inc., Detroit, Mich., a corporation of Delaware Original No. 1,892,441, dated December 27, 1932, Serial No. 181,635, April 7, 1927. Renewed January 7, 1932. Application for reissue August 29, 1938, Serial No. 227,390

26 Claims. (Cl. 68—12)

The invention relates generally to washing machines of the portable, domestic type and adapted more particularly for household use.

A general object of the invention is to provide a washing machine in which the various operations involved in the washing of the articles retained therein may be automatically performed, that is to say, the invention contemplates the provision of means whereby, on the washing receptacle's being started, the same is automatically filled with soap water, and the agitating means operated therein for a predetermined time; whereupon mechanism for effecting a centrifugal action is brought into operation to carry off the surface scum and soap water as and while the latter is being drained off, thereby obviating deposit of such scum and soap water on the articles contained in the washing receptacle. The said receptacle is then again filled, automatically, with rinsing water; whereupon the agitating means are once more brought into action to rinse the wash thoroughly; the rinsing water is automatically drained off after a predetermined period; and the wash subjected to a centrifugal drying action, the machine coming to a complete stop after a predetermined period of drying.

Another feature of the invention resides in the provision of one major control for the machine and so arranged that it will adapt itself to any individual operation in the complete sequence of operations as carried out in the cycle and whereby, also, the time of a cycle of operations may be varied as desired.

A further important feature of the invention resides in the provision of two tubs below the washing tub, the one containing soap water and the other rinsing water, and affording a construction allowing of convenient manual cleaning of the said tubs so that they may be kept in sanitary condition without any alteration or dismantling of the washing machine proper becoming necessary.

The invention has for its object, furthermore, to carry out these various features in the simplest mechanical structure which is coordinated into an assembly of pleasing appearance.

A particular feature of the invention resides in the utilization of centrifugal force to throw off the scum and sediment floating on the surface of the washing water during the lowering of the same in the washing tub or receptacle as it is being drained into a tub or reservoir located below the washing receptacle. This is effected by the centrifugal force brought into play by the rotation at high velocity of the washing receptacle, located within the washing tub, carrying the light floating scum and films to the outer periphery of the washing receptacle and projecting the same through perforations provided therein and thus disposing of the objectionable foreign matter beyond the zone of washing.

Other features of the invention will be hereinafter referred to.

In the drawings, in which a preferred embodiment of the invention has been selected for illustration:

Figure 1:
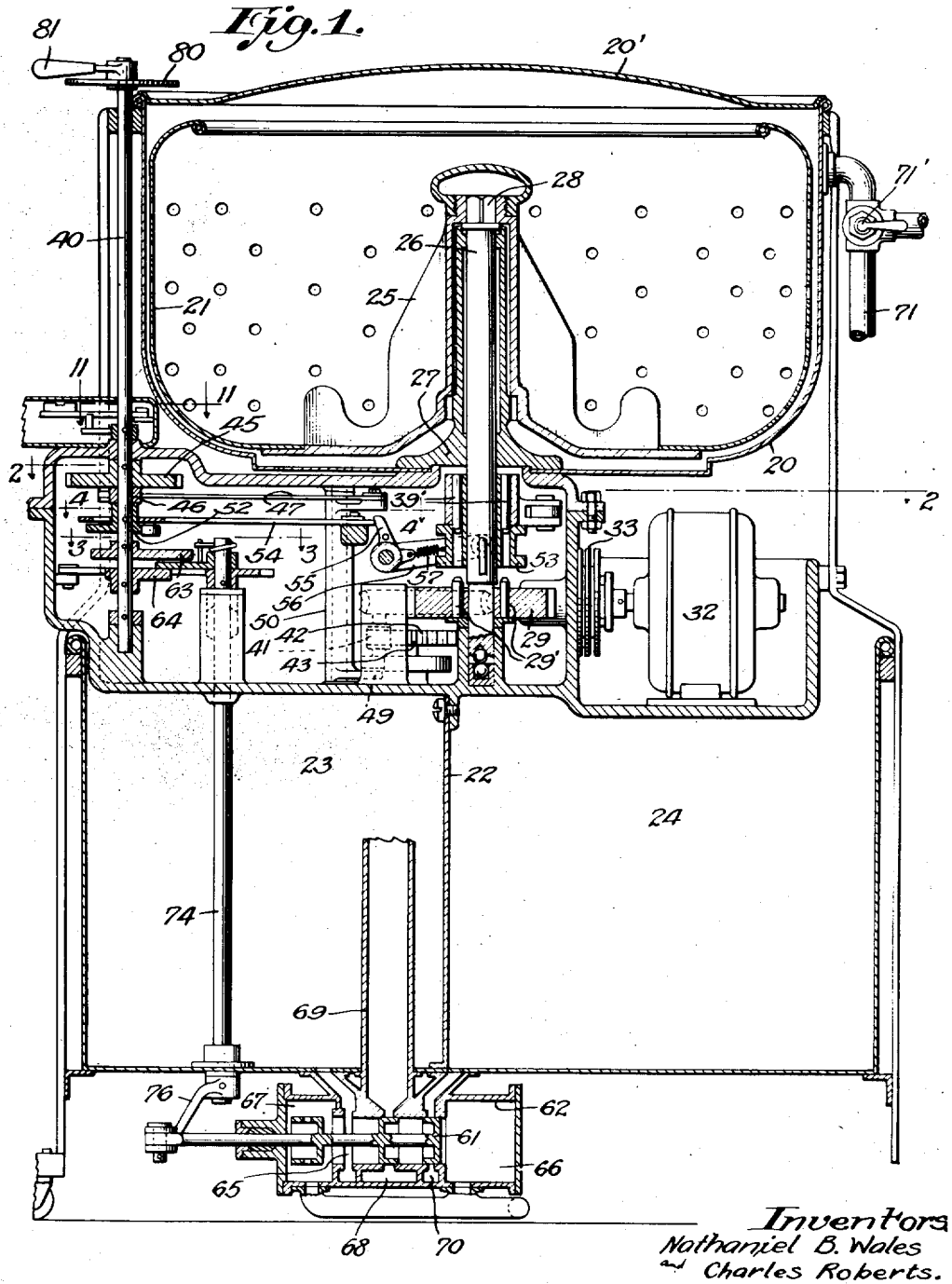
Figure 1 is a vertical section through the washing machine embodying the invention.
Figure 2:
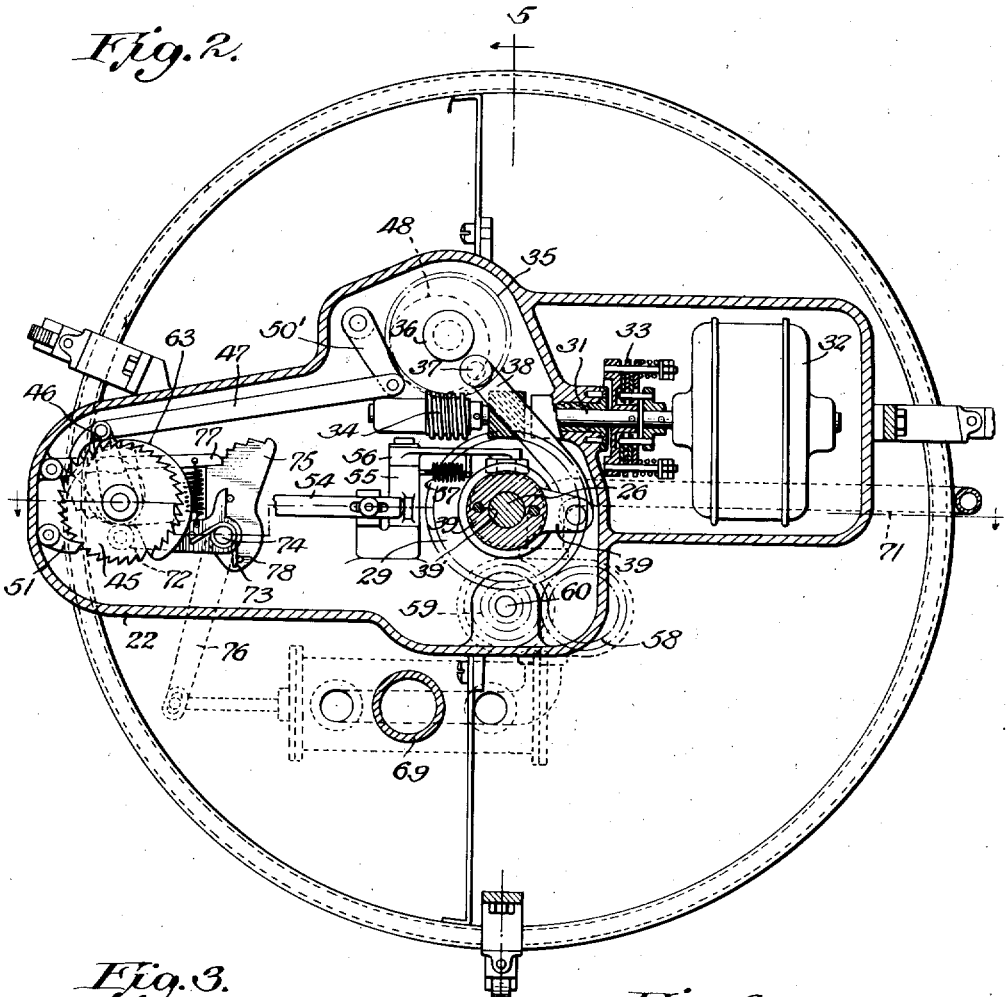
Figure 2 is a transverse horizontal section taken on the line 2—2, Fig. 1, and looking in the direction of the arrows.
Figure 3:
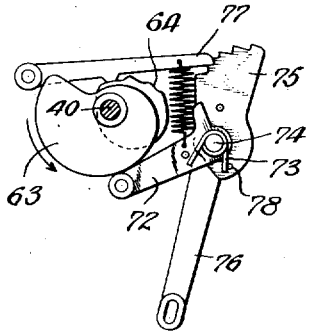
Figure 4:
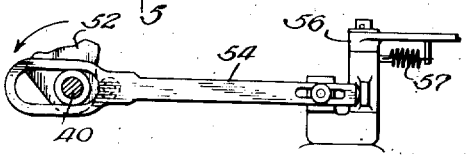
Figure 5:
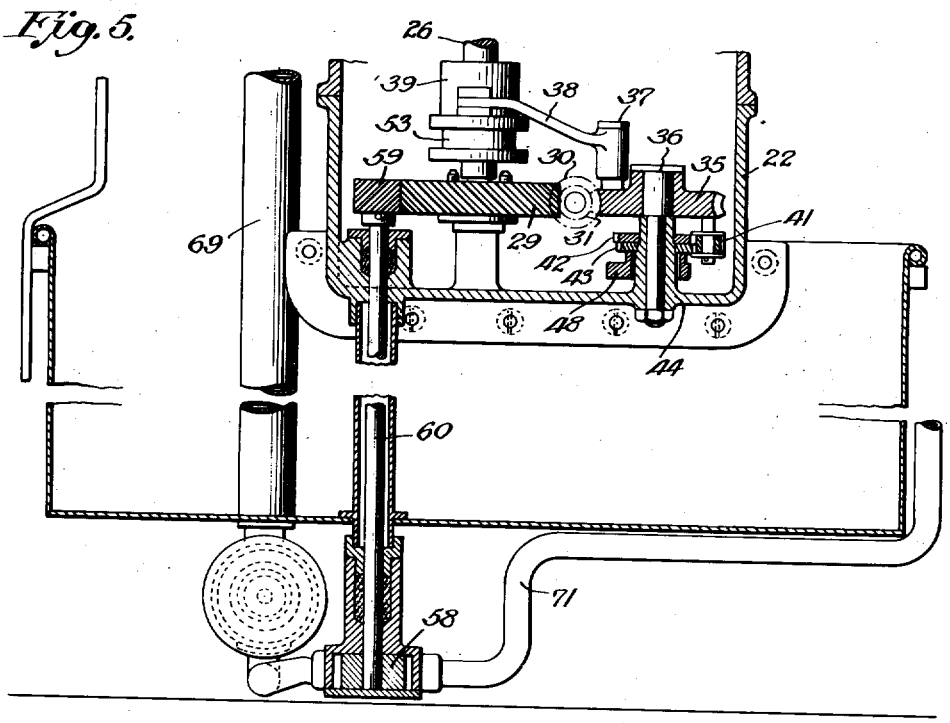
Figure 10:
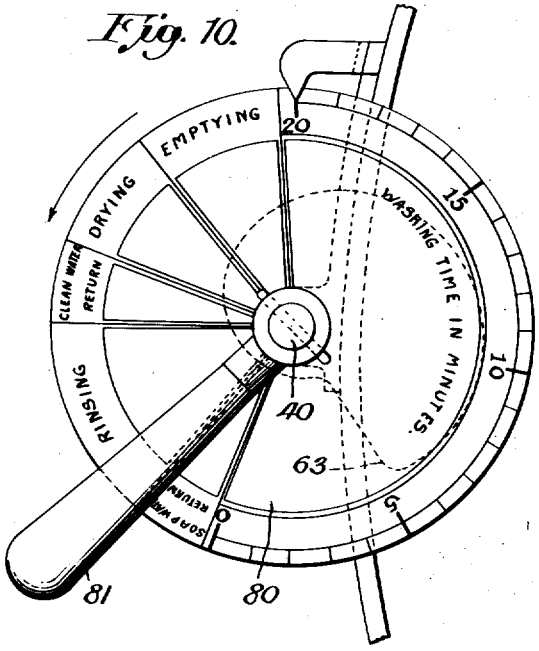
Figure 11:
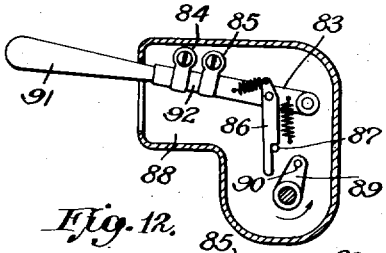
Figure 12:
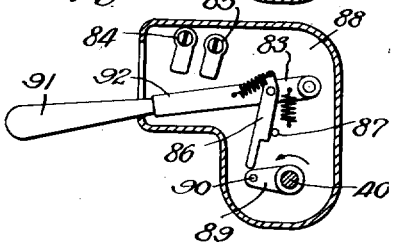

Figures 3 and 4 are fragmentary, transverse, horizontal sections taken, respectively, on the lines 3—3 and 4—4, Fig. 1, and looking in the direction of the arrows;

Figure 5 is a fragmentary detail view, partly in section, illustrating driving mechanism and the main spindle clutch member;

Figures 6 to 9, inclusive, are longitudinal sections of the liquid distributing member at the different positions which the piston thereof assumes during a complete automatic cycle of the machine;

Figure 10 is a plan view of the main control dial with actuating or control handle for setting the various timings of the different operations;

Figures 11 and 12 are fragmentary views of the main starting switch, with casing thereof shown in section, Fig. 11 indicating the operative position of the switch and Figure 12 its inoperative position.

Referring to the drawings for a more detailed description of the invention, reference being had more particularly to Figure 1 of the drawings, the general mode of operation comprises substantially the following steps, to wit: washing of the articles in a stationary tub 20, or rather, in a perforated basket or receptacle 21 rotatably mounted therein, said tub being adapted to be closed when the articles are being washed by a lid or cover member 20'. The basket member is designed to be alternately oscillated or rotated in manner hereinafter set forth, the oscillating action being intended to assist in the thorough cleansing of the contents while the rotational movement thereof is provided for centrifugally removing water and foreign matter therefrom.

Water to which has been added a suitable detergent material, such as soap, is stored below the tub 20, for example, in a tank located at the bottom of the washing machine and divided by a partition or wall 22 into two compartments, the compartment 23 containing the cleansing liquid and the compartment 24, of larger proportions, being designed to contain clean water for rinsing.

In the operation of the washing machine, the upper tub or member 20 is initially filled with the cleansing liquid or soap water and the perforated basket 21 then given an oscillating motion to effect the washing of the contained articles. After a predetermined period, the soap water is to be returned to the lower compartment 23, and during this time the basket is given a rotary motion at high velocity and for a sufficient time to throw off by centrifugal action all the soap water from the wash. Tub 20 is then to be filled with clean water from the lower compartment or rinsing reservoir 24 and the oscillating motion again imparted to said basket. After the wash has been thoroughly rinsed with this rinsing water, the same is returned to the compartment 24 and the basket is then once more rotated at high speed, by virtue of which any water remaining is expelled and the wash thoroughly dried.

To accomplish these various operations and in the required sequence, the basket 21 is made integral with a plate or agitator member 25 mounted on a spindle 26 suported by a vertically disposed standard 27 forming a part also of the surrounding tub 20. The basket and agitator are adapted for driving engagement with the spindle, the outer end of which is squared as at 28 for receiving the basket 21 which may be conveniently set thereover and is driven through the said squared portion when spindle 26 is correspondingly actuated.

The driving mechanism for the spindle 26 is contained in a suitable casing located between the tub 20 and the compartments 23 and 24; and the spindle carries at its lower end a gear 29 meshing with a pinion 30, keyed on a shaft 31 which is driven by a motor 32 through an intermediate friction clutch 33. Shaft 31 carries also a worm 34 which meshes with a worm gear 35 rotatably suported on a stud 36. When the drive is through the shaft 31, pinion 30 and gear 29, the motion imparted to the spindle 26 is of continuous rotational character; and when it is desired to impart to the said spindle an oscillating motion, the drive is taken through the worm gear 35 which carries an eccentrically disposed pin 37 engaging a link 38 carried by a sleeve 39 slidably mounted on the spindle 26, clutch mechanism hereinafter set forth being provided on the spindle 26 to clutch in either the gear 29 or the sleeve 39.

Timing mechanism is provided, also, for the respective periods of oscillation or rotation and comprises a timing shaft 40 vertically disposed adjacent the tub 20 and adapted to be slowly rotated indirectly from the worm gear 35. To this end, the latter carries an eccentrically disposed idler gear 41 and concentrically two gears 42 and 43 which mesh with said idler 41, the latter and the two said gears being mounted beneath worm gear 35. One of the gears, as the gear 42, is fixed on a standard 44 integral with the gear box and the number of teeth thereof exceeds those of the other gear, as gear 43, by one. Accordingly, when worm wheel 35 makes one complete revolution, the gear 43 turns backwardly one tooth and makes one complete revolution, in a direction opposite to worm wheel 35, after the latter has made a number of revolutions equal to the number of teeth of the gear 43.

The motion of said gear wheel 43 is communicated to the timing shaft 40 through a ratchet wheel 45 secured to the latter and pawl and lever 46 mounted upon the shaft and connected by a link 47 to the gear wheel 43 through the following intermediate mechanism. The gear wheel 43 carries a cam 48 controlling one arm 49 of a double-levered hub 50 vertically disposed between the upper and lower walls of the mechanism casing, the other arm 50' of the hub being connected to the link 47 to communicate thereto the rocking motion imparted to the hub by cam 48; and a retaining pawl 51 is provided in connection with said hub to prevent return motion of the ratchet wheel 45 which is advanced by the said motion of the link 47. It will be appreciated that in actual operation the motion thus imparted to the timing shaft 40 is exceedingly slow, amounting to one complete revolution thereof during the complete cycle of operations of the washing apparatus.

The shaft 40, furthermore, carries three cams, 52, 63, and 64, one of which, as the cam 52, controls a clutch 53 slidably keyed on the spindle 26 and adapted to engage with one or the other of the sets of pins 29' or 39' extending respectively from the gear 29 and sleeve 39 to correspondingly clutch one or the other of these members to the spindle 26 for imparting the desired motion thereto. The motion for actuating the said clutch 53 is transmitted thereto through a link 54 controlled by the cam 52 and through a compound lever embodying the arms 55 and 56. These arms are united by a spring 57 to allow the clutch 53 to get into mesh with the gear 29 or sleeve 39 without forcing the respective pins thereof. The usual clutch spring (not shown), acting on arm 56 or the shaft which carries it, holds the link 54 against its cam 52.

The other two cams 63 and 64 are designed to control the supply and return of the liquid to the tub 20; and a gear pump 58 located beneath the tanks 23 and 24 is utilized to forcibly deliver the liquid from the respective tanks to the tub 20, the return being effected by gravity. The gear pump is driven by a gear 59 on a shaft 60 and in mesh with the gear 29 driven from the motor 32.

A piston distributor 61 mounted in a cylinder 62, also located beneath the tanks 23 and 24, may be employed for the distribution of the water. In its several positions it successively opens communication between the soap water tank and the pump, the tub and the soap water tank, the rinse water tank and the pump, the tub and rinse water tank, for the successive washing operations. As indicated in Fig. 1 of the drawings, the piston 61 is in position to allow soap water from tank 23 to flow into chamber 65 of the cylinder 62. This chamber as well as a chamber 66 at the farther end of the cylinder is connected to the suction end of the gear pump, the latter being in direct connection therewith and the former through an intermediate chamber 67 adjacent the chamber 65. An additional and intermediate chamber 68 is in direct communication with the washing tub 20 through a discharge pipe 69 while a still further chamber 70 is in direct communication with the tank 24 containing the rinsing water. In the particular position of parts illustrated in Fig. 1 of the drawings, chamber 68 and chamber 70 are both shut off from their communication with the tub 20 and tank 24 respectively; and the pump will then fill the tub through the pipe 71 connecting the pump with the said tub.

Figure 6:
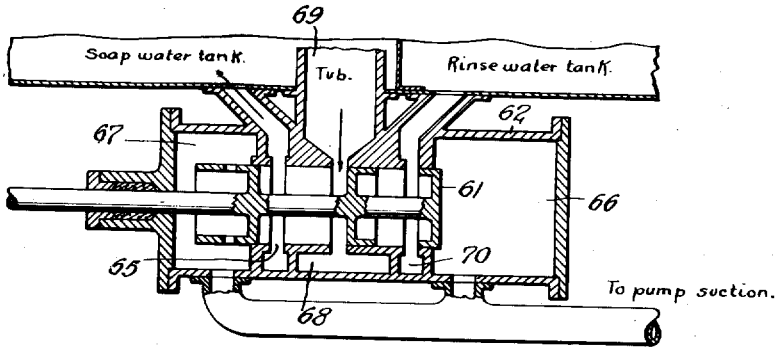
Figure 7:
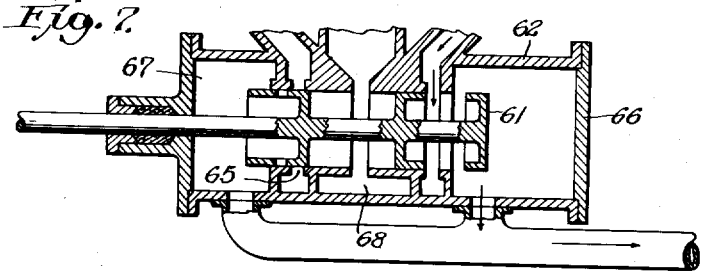

Fig. 6 illustrates the conditions necessary for effecting the return or discharge of water from the tub 20 to the tank 23 after the completion of the washing operation; while Fig. 7 sets forth the conditions under which clean or rinsing water is pumped to the said tub.

Figure 8:
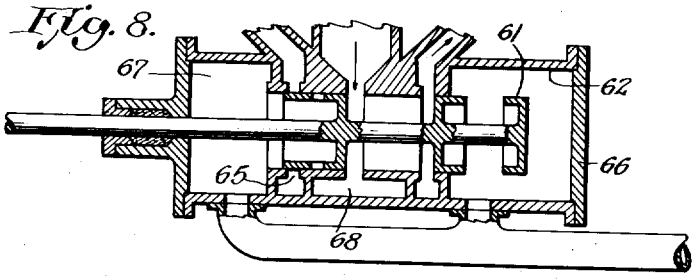
Figure 9:
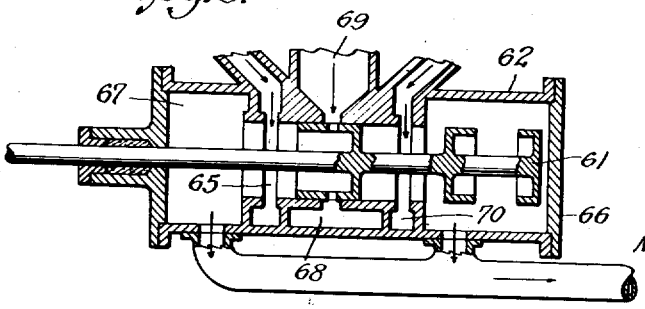

In Fig. 8 the piston position is indicated for the condition in which clean water is returned to the tank; while Fig. 9 indicates the arrangement for placing both tanks 23 and 24 as well as tub 20 in communication with the suction end of the pump to permit all of the water to be withdrawn from the machine and through a three-way valve 71' in the pipe 71.

The step-by-step motion of the piston distributor necessary for carrying out the required operations may be effected through the action of the two further cams 63 and 64 on shaft 40, the former cam by means of an arm 72 placing a spring 73 under tension, said arm being mounted to oscillate freely on a shaft 74 while to the said shaft is keyed a cam member 75 or stepped piece and an arm 76. The other cam 64 on said shaft 40 is designed to control an arm 77 pivoted to the casing and holding the cam member 75 in check. When the cam 63 places spring 73 under tension, the tension is transmitted to the cam member 75 and thus also to the arm 76 by a pin 78 integral with the cam member 75 and against which one end of the spring 73 bears. The different positions of the piston distributor 61 correspond to the particular portions of the member 75 adapted for engagement with the end of retaining member 77, the shaft 74 being turned accordingly and through which movement and the connecting arm 76 the piston 61 is moved.

To afford a visual indication of the particular conditions prevailing as well as to set the mechanism for a desired operation, the upper end of the timing shaft 40 has secured thereto a dial 80 on which are engraved indications and suitable legends registering in rotation with a fixed index 82 mounted on the side of the washing machine, the dial, and thereby the timing shaft, being manually rotatable in the direction of the arrow by means of a handle 81 keyed on the said shaft.

By this expedient, a secondary control is afforded the operator of the machine to select independently any desired operation or portion of the same as well as to repeat such operation without waiting for the completion of the action by the motor.

The latter may be controlled by a switch formed of a pivoted and spring-drawn knife blade 83 adapted to be held in contact with and to bridge the terminals 84 and 85 by a trigger 86 which is spring-drawn against a stop pin 87 fixed in the switch-box 88. An arm 89 carrying a projecting pin 90 is designed to release the trigger 86 when said pin 90 strikes the trigger, arm 89 being mounted on the timing shaft 40 which is slowly rotated by the motor 32 as hereinbefore set forth. In Figure 11 the switch is indicated as in action; while in Figure 12 is shown in inoperative position, but may be reset manually through a handle 91 projecting beyond the switch-box.

The mechanism hereinbefore described thus enables all of the various operations to be performed automatically, if desired, and whereby the soiled wash, having first been delivered into the basket 21, is successively washed, rinsed and dried. By imparting a high rotational velocity to the wash during the period when the wash water is being drained therefrom, all of the scum, dirt and other foreign material floating on the surface of the water is removed from contact with the wash so that none remains to adhere thereto; and the wash after having been rinsed and dried in the manner aforesaid, is delivered thoroughly cleansed.

What we claim is:

1. A washing machine, comprising an upper tub and washing receptacle movably mounted therein, a cleansing liquid tank and a rinsing water tank supported beneath said tub and connected to said tub to add to the stability thereof, means automatically to selectively deliver liquid to and from the said lower tanks to the said tub, and including pumping means and an interposed distributor and means synchronized with said selective means for operating said receptacle at a relatively low speed to wash or rinse the work when there is cleansing liquid or rinsing water in said tub and for rotating said receptacle at high speed to dry the work when the cleansing liquid and rinsing water has all been delivered from the tub back to said tanks.

2. A washing machine, comprising an upper tub and a washing receptacle movably mounted therein, means to drive said receptacle, a cleansing liquid tank and a rinsing water tank supported beneath said tub and connected to said tub to add to the stability thereof, means actuated from the driving means for said washing receptacle for selectively delivering liquid to and from the lower tanks to the said tub, and means for automatically controlling the drive means and the selective delivering means and causing the operation of the receptacle at a relatively low speed when there is cleansing liquid or rinsing water in the tub and at a high speed causing centrifugal drying when the cleansing liquid and the rinsing water has all been returned to said tanks.

3. A washing machine comprising a tub and a washing receptacle movably mounted therein and means to impart to the receptacle an oscillatory movement, means to impart to the receptacle a rotational movement and timing mechanism to cause the last mentioned means to be rendered operable after the receptacle has been oscillated for a predetermined time.

4. A washing machine, comprising a tub and a washing receptacle movably mounted therein, an operating motor for driving the washing receptacle, intermediate mechanism for oscillating said receptacle for a predetermined period and then imparting a rotational movement thereto and including a clutch device, a timing shaft rotated by the motor, and means carried by said timing shaft for controlling the said clutch device.

5. A washing machine, comprising a tub and a washing receptacle movably mounted therein, an operating motor for driving the washing receptacle, intermediate mechanism for oscillating said receptacle for a predetermined period and then imparting a rotational movement thereto and including a clutch device, a timing shaft rotated by the motor, a cam on said timing shaft, and means controlled thereby for positioning the said clutch device to clutch in the intermediate mechanism for imparting to the washing receptacle an oscillating motion and for positioning the clutch device to clutch in the intermediate mechanism for imparting to the washing receptacle a rotational motion.

6. A washing machine, comprising a tub and a washing receptacle movably mounted therein, an operating motor for driving the washing receptacle, intermediate mechanism for oscillating said receptacle for a predetermined period and then imparting a rotational movement thereto and including a clutch device, a timing shaft rotated by the motor, means carried by said timing shaft for controlling the said clutch device, and an operating handle secured to the timing shaft for affording a manual control of the driving mechanisms for the receptacle.

7. A washing machine, comprising a tub and a washing receptacle movably mounted therein, an operating motor for driving the washing receptacle, intermediate mechanism for oscillating said receptacle for a predetermined period and then imparting a rotational movement thereto and including a clutch device, means to supply liquid to and remove same from the said tub, a timing shaft rotated by the motor, and means carried by said timing shaft for controlling the said clutch device and the liquid supply and removal means.

8. A washing machine, comprising a tub and a washing receptacle movably mounted therein, an operating motor for driving the washing receptacle, intermediate mechanism for oscillating said receptacle for a predetermined period and then imparting a rotational movement thereto and including a clutch device, a timing shaft rotated by the motor, means carried by said timing shaft for controlling the said clutch device, an operating handle secured to the timing shaft for affording a manual control of the driving mechanisms for the receptacle, and cooperating indexing means associated with the handle.

9. A washing machine, comprising an upper tub and washing receptacle movably mounted therein, an operating motor for driving the washing receptacle, intermediate mechanism for oscillating said receptacle for a predetermined period and then imparting a rotational movement thereto and including a clutch device, a cleansing liquid tank and a rinsing water tank supported beneath said tub, means to selectively deliver liquid to and from the said lower tanks to the said tub, and including pumping means and an interposed piston distributor, a timing shaft rotated by the motor, means carried by said timing shaft for controlling the clutch device, and means carried by said timing shaft for controlling the operation of the piston distributor.

10. A washing machine, comprising an upper tub and washing receptacle movably mounted therein, an operating motor for driving the washing receptacle, intermediate mechanism for oscillating said receptacle for a predetermined period and then imparting a rotational movement thereto and including a clutch device, a cleansing liquid tank and a rinsing water tank supported beneath said tub, means to selectively deliver liquid to and from the said lower tanks to the said tub, and including pumping means and an interposed piston distributor, a cam on said timing shaft, means controlled thereby for positioning the said clutch device to clutch in the intermediate mechanism for imparting to the washing receptacle an oscillating motion and for positioning the clutch device to clutch in the intermediate mechanism for imparting to the washing receptacle a rotational movement, and two cams rotatable with the timing shaft for effecting the advance of the piston of the distributor.

11. A washing machine, comprising an upper tub and a washing receptacle movably mounted therein, an operating motor for driving the washing receptacle, a cleansing liquid tank and a rinsing water tank supported beneath said tub, a piston distributor having communication directly with the two lower tanks and the said tub, pumping means associated with said piston distributor and a filling pipe therefrom extending into the upper tub, and a three-way valve in said filling pipe with drainage outlet.

12. A washing machine, comprising an upper tub and a washing receptacle movably mounted therein, an operating motor for driving the washing receptacle, a cleansing liquid tank and a rinsing water tank supported beneath said tub, a piston distributor having communication directly with the two lower tanks and the said tub, pumping means associated with said piston distributor and a filling pipe therefrom extending into the upper tub, and intermediate mechanism connecting the motor with the pump and with the piston distributor to actuate said pump and said distributor, together with means actuated by said motor for controlling the speed at which the receptacle is driven in accordance with the position of the distributor and in such a manner that the receptacle is operated with a washing action at a relatively low speed whenever there is cleansing liquid or rinsing water in the tub and is rotated at a relatively high speed for centrifugal drying when all of the cleansing liquid and the rinsing water has been returned to said tanks.

13. A washing machine comprising an upper tub and a washing receptacle movably mounted therein, an operating motor for driving the washing receptacle, a cleansing liquid tank and a rinsing water tank supported beneath said tub, a pump connected to pump water to said tank, a piston distributor arranged upon movement in one direction successively to connect the cleansing liquid tank to the pump, the tub to the cleansing liquid tank, the rinsing water tank to the pump, the tub to the rinsing water tank, a timing shaft, and a cam controlled thereby to control the movement of the piston, together with a cam controlled by said timing shaft and means actuated by said last cam for controlling the speed at which the receptacle is driven in accordance with the position of the distributor and in such a manner that the receptacle is operated with a washing action at a relatively low speed whenever there is cleansing liquid or rinsing water in the tub and is rotated at a relatively high speed for centrifugal drying when all of the cleansing liquid and the rinsing water has been returned to said tanks.

14. A clothes washing machine comprising a tub to contain water, clothes washing and drying mechanism rotatably mounted in said tub, a motor to actuate said mechanism, instrumentalities interposed between said motor and said mechanism to cause said mechanism to first oscillate said clothes through the water in said tub to wash the same and to then rotate said clothes in said tub to expel the water therefrom, means to selectively connect said instrumentalities with said motor, and a timing device having means for controlling said connecting means.

15. A clothes washing machine comprising a tub to contain water, clothes washing and drying mechanism rotatably mounted in said tub, a motor to actuate said mechanism instrumentalities interposed between said motor and said mechanism to cause said mechanism to first oscillate said clothes through the water in said tub to wash the same and to then rotate said clothes in said tub to expel the water therefrom, means to selectively connect said instrumentalities with said motor, and a timing device driven by said motor and having means for controlling said connecting means.

16. In a clothes washing machine comprising a tub to contain water, clothes washing and drying mechanism rotatably mounted in said tub, said tub having an outlet, operable means for controlling the discharge of water through said outlet, instrumentalities to cause said mechanism to oscillate the clothes through the water in said tub to wash the same, to operate said controlling means to cause the water to be discharged from said tub and to then rotate said clothes in said tub to expel the water from said clothes, a motor, a timing device, and means controlled by said timing device to cause said instrumentalities to be operated in sequence.

17. A clothes washing machine comprising a tub to contain water, clothes washing and drying mechanism rotatably mounted in said tub, a motor to actuate said mechanism, instrumentalities interposed between said motor and said mechanism to cause said mechanism to first oscillate said clothes through the water in said tub to wash the same and to then rotate said clothes in said tub to expel the water therefrom, means including a clutch for selectively connecting said instrumentalities with said motor, valve means to control the discharge of water from said tub, and a device driven by said motor to actuate said clutch and said valve means in sequence.

18. A washing machine comprising a tub, a perforated clothes receptacle rotatably mounted in said tub and an agitator mounted within said clothes receptacle, a motor for actuating said agitator and said clothes receptacle, intermediate mechanism for oscillating said agitator for a predetermined period and then rotating said clothes receptacle and including a clutch device, a timing device operated by said motor, and means carried by said timing device for controlling said clutch device.

19. In a clothes washing machine, a tub, a perforated clothes receptacle rotatably mounted in said tub, an agitator arranged within said clothes receptacle, power operated driving mechanism, instrumentalities driven by said driving mechanism to actuate said agitator and said clothes receptacle and to control the delivery of water to said tub and the discharge of water therefrom, and means actuated by said driving mechanism to cause said instrumentalities to operate in timed relation one to the other to cause operative relatively slow movement to be imparted to said agitator, to discharge the wash water from said tub and cause said tub to be filled with rinse water, to again actuate said agitator at a relatively low speed, to discharge the rinse water from said tub, and then to rotate said clothes receptacle at a relatively high speed to expel the water from said clothes.

20. In a clothes washing machine, a tub, a perforated clothes receptacle rotatably mounted in said tub, an agitator arranged within said clothes receptacle, power operated driving mechanism, instrumentalities driven by said driving mechanism to actuate said agitator and said clothes receptacle and to control the delivery of water to said tub and the discharge of water therefrom, and means actuated by said driving mechanism to cause said instrumentalities to operate in timed relation one to the other to cause operative relatively slow movement to be imparted to said agitator, to discharge the wash water from said tub, to rotate said clothes receptacle at a relatively high speed to expel the water from said clothes, to cause said tub to be filled with rinse water, to again actuate said agitator at a relatively low speed, to discharge the rinse water from said tub, and to then rotate said receptacle at said relatively high speed to expel the water from the clothes.

21. In a clothes washing machine comprising a tub, means to conduct wash water and rinse water to and from said tub, means for agitating the clothes in said tub, motor driven mechanism for causing wash water to be discharged from said tub and rinse water delivered thereto, for actuating said agitating means to agitate the clothes in said wash water and in said rinse water with a relatively slow washing action and for causing the rinse water to be discharged from said tub, and for rotating said agitating means at relatively high speed for expelling the water from said clothes, and timing mechanism to control the sequence of said operations and to control the duration of the washing and rinsing and expelling operations.

22. In a clothes washing machine comprising a tub, means to conduct wash water and rinse water to and from said tub, and means for agitating the clothes in said tub comprising a rotatably mounted perforated receptacle adapted to receive the clothes, motor driven mechanism for causing wash water to be discharged from said tub and rinse water delivered thereto, for actuating said receptacle relatively slowly to agitate the clothes in said wash water and in said rinse water and for causing the rinse water to be discharged from said tub, and for rotating said receptacle at relatively high speed to expel water from said clothes, and timing mechanism to control the sequence of operations and to control the duration of said washing and rinsing and expelling operations.

23. In a clothes washing machine comprising a tub, a clothes receptacle mounted for rotary movement in said tub, and means for conducting wash water and rinse water to and from said tub, motor driven mechanism to cause said clothes receptacle to oscillate in said tub, to cause wash water to be discharged from said tub and rinse water to be delivered thereto, to cause said clothes receptacle to oscillate in said rinse water, to cause said rinse water to be discharged from said tub and to cause said clothes receptacle to be rotated to expel water from said clothes, said motor driven mechanism including means to control the sequence and duration of the respective operations.

24. In a clothes washing machine comprising a tub, a clothes receptacle mounted for rotary movement in said tub, and means for conducting wash water and rinse water to and from said tub, motor driven mechanism to cause said clothes receptacle to oscillate in said tub, to cause wash water to be discharged from said tub and rinse water to be delivered thereto, to cause said clothes receptacle to be rotated while said wash water is being discharged from said tub, to cause said clothes receptacle to oscillate in said rinse water, to cause said rinse water to be discharged from said tub and to cause said clothes receptacle to be rotated to expel water from said clothes, said motor driven mechanism including means to control the sequence and duration of the respective operations.

25. In a clothes washing machine comprising a tub, means to conduct wash water and rinse water to and from said tub, and means for agitating the clothes in said tub, motor driven mechanism for causing wash water to be discharged from said tub and rinse water delivered thereto, for actuating said agitating means to agitate the clothes in said wash water and in said rinse water and for causing the rinse water to be discharged from said tub, and timing mechanism to control the sequence of said operations and to control the duration of the washing operation, said timing mechanism comprising a control shaft and a ratchet drive therefor, said shaft having indicator means which is manually operable to advance the shaft and the timing mechanism to shorten one of said operations when desired, by turning the shaft relatively to said drive.

26. In a clothes washing machine comprising a tub, means to conduct wash water and rinse water to and from said tub, and means for agitating the clothes in said tub, motor driven mechanism for causing wash water to be discharged from said tub and rinse water delivered thereto, for actuating said agitating means to agitate the clothes in said wash water and in said rinse water and for causing the rinse water to be discharged from said tub, and for expelling water from said clothes, and timing mechanism to control the sequence of operations and to control the duration of said washing, rinsing and expelling operations, said timing mechanism comprising a control shaft and a ratchet drive therefor, said shaft having indicator means which is manually operable to advance the shaft and the timing mechanism to shorten one of said operations when desired, by turning the shaft relatively to said drive.

NATHANIEL B. WALES.
CHARLES ROBERTS.